United States Patent

[11] 3,612,883

[72] Inventor Norman E. Pedersen
    Wilmington, Mass.
[21] Appl. No. 803,347
[22] Filed Feb. 28, 1969
[45] Patented Oct. 12, 1971
[73] Assignee Avco Corporation
    Cincinnati, Ohio

[54] RESONANT CAVITY PHOTON SENSOR COMPRISING SEMICONDUCTOR MATERIAL SANDWICHED BETWEEN TWO LAYERS OF DIELECTRIC
10 Claims, 4 Drawing Figs.

[52] U.S. Cl. ............................................ 250/211,
    250/216, 332/3, 332/54, 333/83, 334/15
[51] Int. Cl. ........................................ H01j 39/12,
    H01p 7/06, H03c
[50] Field of Search .......................... 334/15;
    250/211, 216; 332/3, 54; 333/83

[56] References Cited
UNITED STATES PATENTS
2,928,056 3/1960 Lampert...................... 332/3
2,984,795 5/1961 Robillard...................... 332/54

OTHER REFERENCES
Sommers et al.: " Photoconductive Detector," Proceedings of the IEEE, Vol. 54, pp. 1559, 1560, 1566 and 1567 relied upon, Nov. 1966.

Primary Examiner—James W. Lawrence
Assistant Examiner—T. N. Grigsby
Attorneys—Charles M. Hogan and Abraham Ogman ABSTRACT: The invention relates to a sensor which uses a semiconductor material which responds to photons to produce electron-hole pairs. The semiconductor operates in combination with a microwave cavity. The presence of an electron and/or hole in the semiconductor is sensed by a change in capacitance of the resonant cavity. The result is a signal output from the resonant cavity. A novel approach to bringing a photon to the semiconductor is described and optimum sensor parameters cited.

INVENTOR.
NORMAN E. PEDERSEN

INVENTOR.
NORMAN E. PEDERSEN

RESONANT CAVITY PHOTON SENSOR COMPRISING SEMICONDUCTOR MATERIAL SANDWICHED BETWEEN TWO LAYERS OF DIELECTRIC

BACKGROUND OF THE INVENTION

The operation of the device is based on microwave biasing of a semiconductor crystal, rather than conventional DC or low-frequency biasing. The principle of photon detection in the infrared range based on microwave biasing was patented under N. Pedersen and G. Doundolakis in Pat. No. 2,954,477 Sept. 1960. Considerable work has been done in this area more recently by Sommers et al. as reported in the proceedings on IEEE, Volume 54, page 1553, Feb. 1964 and Volume 52, page 144, Feb. 1964. The subject is also discussed in A Unique Laser Detector Utilizing the Photodielectric Effect in Cooled Semiconductors by Stone and Hartwig, University of Texas, College of Engineering, Tech. Report No. 39, Sept. 1967.

In the past the overall performance of "good" conventional semiconductor detectors operating at a wavelength of, for example, 1 micron, is about four orders of magnitude below that of a good photomultiplier tube operating in the visible region of the spectrum. The cooled photomultiplier tube will act as a photon counter with a response time of approximately $10^{18}$ seconds and a false count rate of a few per second when the incident wavelength is approximately 5000 A.

It is possible to provide single photon counting capability, particularly in the infrared region with a response time of the order of $10^{18}$ seconds through the use of a semiconductor crystal of high purity cooled to cryogenic temperatures.

It is an object of the invention to provide a semiconductor photon detector which avoids the limitations and disadvantages of such prior art devices.

It is another object of the invention to provide a semiconductor photon detector having an extremely high sensitivity and a capability of detecting the presence of a single photon.

It is yet another object of the invention to provide a semiconductor photon detector having highly efficient optical coupling means.

It is still another object of the invention to provide a semiconductor photon sensor having the capability of sensing the conduction of electrons produced one at a time as they diffuse through a semiconductor crystal.

Other objects of the invention are to provide a semiconductor photon detector exhibiting (i) low shot noise and a low false count rate and, (ii) a high microwave response to the presence of the motion of an electron and/or hole in the semiconductor.

In accordance with the invention a semiconductor photon detector comprises a reentrant resonant cavity having a high intensity electric field gap region defined by spaced opposing electrically conductive surfaces. Opposing spaced dielectric layers are positioned to cover at least the opposing electrically conductive surfaces. A wafer of a photon sensitive semiconductor material fills the space between the dielectric material. Means is provided for conveying photon to the semiconductor and means is provided for coupling a signal into and out of the reentrant cavity.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
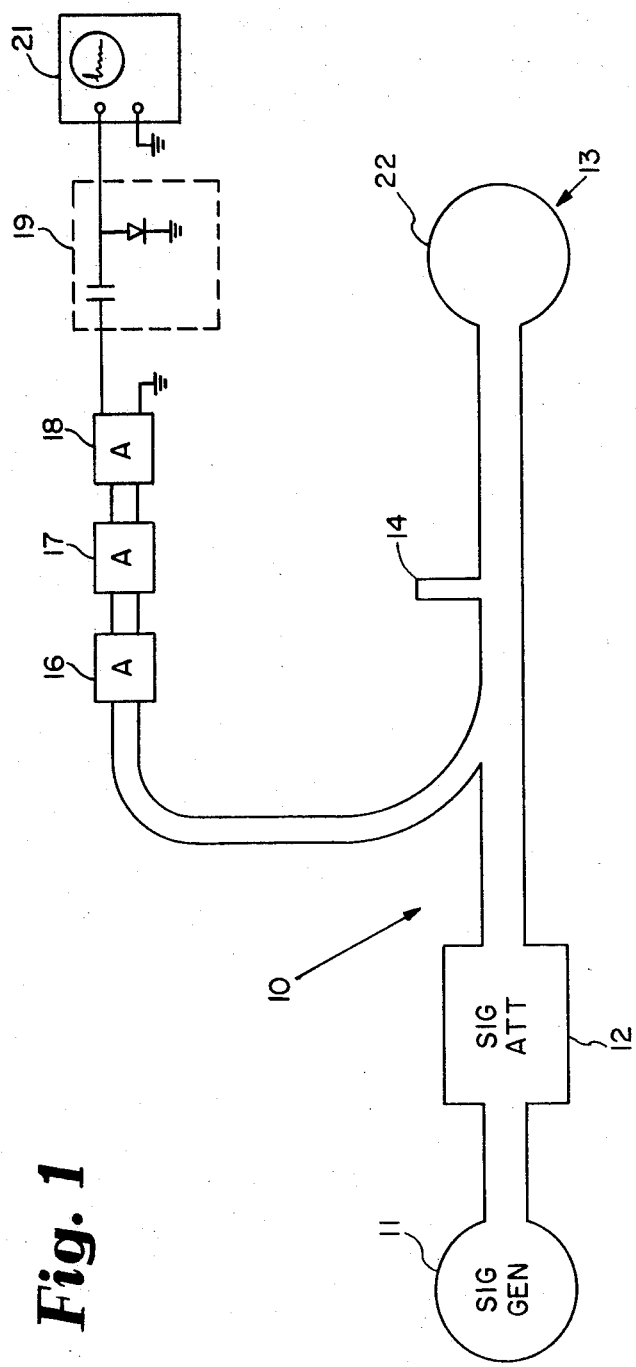
FIG. 1 is a schematic representation of a photon detection system including a schematic representation of the photon detector embodying the principles of the present invention.

Referring to FIG. 1 of the drawings there is depicted a photon detection system 10 comprising a signal generator 11 coupled in series with a signal attenuator 12. The signal attenuator 12 is coupled to a photon sensor 13 through an impedance matching device 14.

A branch circuit between the signal attenuator 12 and the impedance matching device 14 couples a signal output from the photon sensor 13 and the impedance matching device 14 to a bank of wide band microwave amplifiers 16, 17 and 18. The output of the amplifier 18 is coupled to a detector 19 and the detected signal is, in turn, coupled to a wide band counter or oscilloscope 21.

The signal generator 11, signal attenuator 12, impedance matching device 14, amplifiers 16—18, detector 19 and oscilloscope 21 are all of a conventional nature and readily available on the open market.

Figure 2:
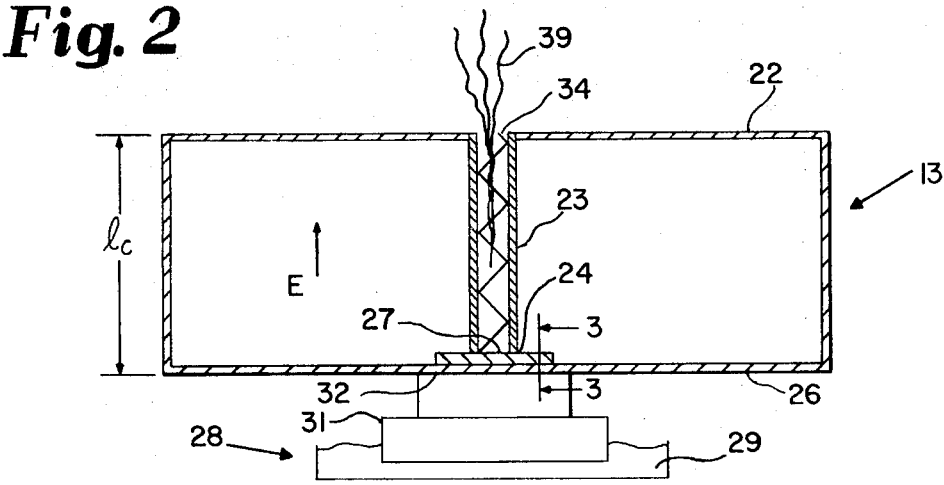
FIG. 2 is a cross-sectional schematic representation of a reentrant resonant cavity.
Figure 3:
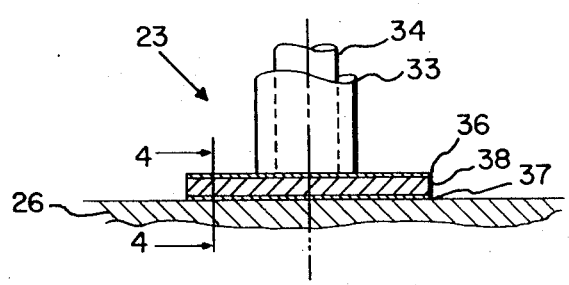
FIG. 3 is an enlarged section of a portion of the reentrant cavity taken along lines 3—3.
Figure 4:
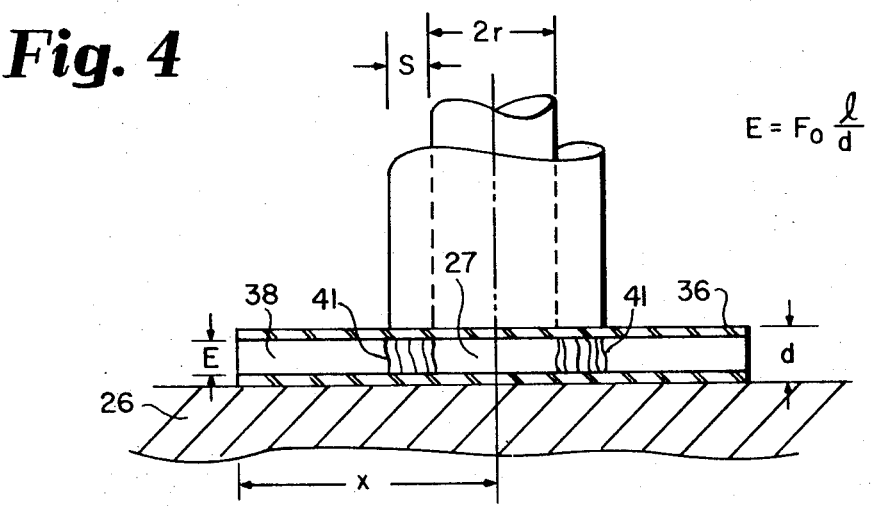
FIG. 4 is a further enlargement of the gap region of the reentrant cavity taken along lines 4—4.

The details of the photon sensor 13 are best described in relation to FIGS. 2 through 4. The photon sensor 13 comprises a reentrant resonant cavity 22 containing a center post 23. An end surface 24 of the post 23 is spaced from one wall 26 of the reentrant cavity to form a gap 27.

As it is desirable to operate the semiconductor at cryogenic temperatures; the number 28 designates a schematic representation of the liquid helium cooling apparatus. Though oversimplified structurally the cooling apparatus 28 comprises a reservoir of liquid helium 29 and a copper post 31 emersed in the liquid helium 29. A surface 32 of the copper post is in direct contact with the wall 26 of the reentrant cavity 22 in order to maintain the gap region of the reentrant cavity 22 at cryogenic temperatures.

Referring to FIG. 3 of the drawings, the post 23 contains a metal cylindrical sleeve 33. The center passage of the metal sleeve 33 is filled with a clad photon conducting fiber made preferably in this case of a core of Schott flint glass clad with a soda lime glass. This combination of materials is capable of transmitting efficiently infrared photons.

It will be noted for FIG. 3 that the gap between the post 23 and the reentrant cavity wall 26 is filled by a sandwichlike assembly. The sandwichlike assembly includes a pair of spaced opposing dielectric layers 36 and 37. The space between the dielectric layers 36 and 37 is completely filled with a semiconductor crystal 38. The dielectric material 36 and 37 is optically transparent to photons and particularly infrared photons in this illustration. It will be noted that the diameter of the metal sleeve 33 is smaller than the diameter of the dielectric layers 36 and 37 and the semiconductor 38.

The operation of the photon detector is best understood by reference to FIGS. 1, 2 and 4. Signal generator 11 is preferably tuned to X-band, or about 10,000 megacycles. The signal output of the signal generator 11 is greatly reduced power and coupled to the resonant cavity 22 while it is substantially absorbed.

A small residual output signal is transmitted to the amplifier chain and amplified. The amplified signal is rectified by the detector and coupled to the oscilloscope 21 and displayed.

The function of the impedance matching device 14 is to provide a small residual signal from cavity 22 as possible.

The signal present in resonant cavity 22 sets up an electric field 41 (FIG. 4) bridging the gap between the center post 23 and the cavity wall 26. The gap needs to be exceedingly small so that a relatively very high intensity field is produced.

Should an electron-hole pair appear in the semiconductor and traverse into the electric field, it will cause a change in the capacitance formed by the center post 23 and cavity wall 26 to take place. The magnitude of change is a direct function of the gap spacing, increasing as spacing is reduced.

The change in capacitance produces a perturbation in the output signal from the resonant cavity 22. The signal perturbation is amplified, detected and displayed. The magnitude of the signal perturbation follows the change in capacitance.

Incident photons 39 impinge on the light conducting fiber 34 and are transmitted by total internal reflection to the dielectric layer 36. As the dielectric layer 36 is optically transparent, photons pass into the semiconductor wafer 38. The semiconductor material responds to the photon energy by producing an electron-hole pair for each photon absorbed. Under optimum conditions each single photon of energy will produce a single electron-hole pair. The electron, though produced in the semiconductor beneath the fiber 34 will diffuse very quickly, laterally, into the capacitive gap 27. The passage of the electron through the electric field alters the capacity of the high intensity electric region of the reentrant cavity. The change in capacitance then manifests itself as a phase change in the signal output from the reentrant cavity 22. The output signal is transmitted (FIG. 1) through the impedance matching device 14 and through the amplifiers 16—18. The amplified signal is detected by detector 19 and displayed on the counter 21.

Parameters

The sensitivity of the system is limited by the thermal noise level of the input of amplifier 16 per second for single photon counting. As is well known, the noise level is proportional to the band width on the amplifier. A limiting factor of the band width, to maintain a manageable noise level, is $10^8$ cycles per second.

The time spent by an electron or hole in the high field region determines the response time of the sensor. It follows, therefore, that the thickness of the metal cylindrical sleeve 33 is a determining factor. The thickness of the metal sleeve 33 is approximately 10 microns to limit the time spent by an electron and/or hole in the field to $10^{18}$ seconds. Gold is preferred as it provides good conductivity, resistance to surface oxidation and is mechanically malleable, an important feature during handling and mounting to the cavity. The sleeve 33 is a gold coating built around a photon transmitting fiber 34. This fiber wants to be as fine as possible commensurate with efficient photon transmission for the most efficient transmission of photons.

Digressing momentarily, the term numerical aperture, or N.A. as borrowed from lens optics, describes the light gathering properties of a fiber. N.A. is a function of the index of refraction of the core and clad material making up the optical fiber. Increasing indexes of refraction of the core material, particularly, increases N.A. As N.A. becomes higher, the collection angle and light gathering efficiency increases.

The combination of Schott flint, type F-2 optical glass and a soda lime cladding generates N.A. value of 0.56. This corresponds to a focal length of $f/0.9$. The significance of this improvement can be better appreciated when compared to the $f/4$ optics described by Sommers.

It is also important to note that the combination of flint and soda lime is an efficient transmitter of photons in the range of frequencies used in this preferred example, namely, in the one micron region. Another excellent material in this frequency region is Stochiometric $As_2 S_3$ glass core with a modified sulfide coating. An $As_2S_3$ optical fiber transmits out to 12 microns for a fiber length of 7 mm. with virtually negligible attenuation.

As indicated, the diameter of the optical fiber should be as small as possible. The limiting factor is the manufacturing state of the art. As a practical matter fiber diameters of 10 microns consisting of an 8 micron transmitting core surrounded by a 1 micron cladding appears to be as small as it is possible to make today.

It is necessary to provide a very small diameter electrical center post, approximately 25–50 microns for reasons discussed previously. The dimensions of the electrical post determine some of the important parameters of the microwave cavity geometry.

An electron and/or hole produced in the semiconductor material diffuses in the direction of the electrical field. It drifts in an erratic pattern laterally to the field and will generally not recombine within $10^{18}$ seconds. To further assure that there is no loss of an electron to the sleeve 30 or cavity wall 26, dielectric layers 36 and 37 are provided to separate the semiconductor wafer 38 from the post 33 and cavity wall 26. The layers 26 and 27 are obviously transparent to photons, in this case saphire is the preferred material for photons in the 1 micron region. Silicon oxide, silicon dioxide and magnesium oxide will also work as a dielectric medium.

The principal purpose of constructing a small post 33 is to obtain the highest field concentration and strength as possible. Design values for the field of strength are from about 200 to 2000 volts per cm. Higher values may be used but the results achieved are not commensurate with the increase in field intensity. An electron traversing the field under these conditions produces an easily detectable signal perturbation.

The dielectric layers 36 and 37 together with the semiconductor wafer 38 define the gap 27 width between the post 33 and the cavity wall 26. A preferred gap 27 width is 0.5 to 1 micron when germanium is the semiconductor. In any event the gap width should not exceed 10 microns as it will not be possible to detect the presence of an electron and/or hole in the electronic field, the change in capacitance will be too small.

The preferred thickness of the semiconductor wafer 38 is the thickness across which the photon flux is attenuated to $1/e$ of the incident photon flux. This is commonly called the optical absorption depth. The minimum semiconductor wafer thickness is that thickness which will allow a photon to pass right on through.

Germanium is preferred because of its excellent properties at cryogenic temperatures in the 1 micron radiation region. Other suitable materials are lead sulfide, indium antimony, copper doped germanium and silicon.

The low temperature reduces the false count rate due to thermally generated electron-hole pairs in the semiconductor.

Another reason for operating the semiconductor at low temperature is that the momentum relaxation time $\tau_m$ is significantly increased as the temperature is lowered. For example in germanium and silicon, $\tau_m=10^{13}$ seconds at room temperature, while at 4.2° K., $\tau_m$ $10^{111}$ seconds. In order to obtain a maximum change in capacitance due to an electron and/or hole, the product $\omega\tau_m$ should be equal to or greater than unity, where $\omega=2\pi f_o$ and $f_o$ equals the microwave frequency.

The structure described above is designed as a highly sensitive photon detector. Theoretically it is capable of detecting the presence of a single electron and/or hole produced by a single photon absorbed in the semiconductor wafer 28.

The various features and advantages of the invention are though to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A photon sensor including a reentrant resonant cavity having a pair of spaced opposing electrically conductive surfaces defining a gap;
    means for developing an electric field across the gap;
    means for coupling a signal into and out of the reentrant resonant cavity, the improvement comprising a semiconductor assembly comprising a wafer of photon responsive semiconductor material containing top and bottom layers of a photon transparent dielectric material, the semiconductor assembly being positioned into the gap filling the gap with said dielectric material in contact with an electrically conductive surface; and
    means for coupling photons to said semiconductor wafer through said dielectric material.

2. A photon sensor as described in claim 1 in which the maximum gap width is 10 microns.

3. A photon sensor as described in claim 1 in which the lateral dimension of the electric field is less than the average distance required for a photo electron produced in the semiconductor material to recombine in the semiconductor material.

4. A photon sensor as described in claim 1 which includes in addition means for maintaining the semiconductor at cryogenic temperatures.

5. A photon sensor as described in claim 1 in which the thickness of the semiconductor wafer is adequate to absorb photons entering the semiconductor wafer.

6. A photon sensor as described in claim 5 in which the wafer thickness is equal to the thickness in which the photon flux drops to $1/e$ of the incident photon flux.

7. A photon sensor comprising:
- a reentrant resonant cavity including a center post, said center post being spaced from an electrically conducting surface forming a capacitance gap;
- a semiconductor assembly comprising a wafer of photon responsive semiconductor material containing top and bottom layers of a photon transparent dielectric material, the semiconductor assembly being positioned filling the gap; with said dielectric material adjacent to said center post and the electrically conducting surface;
- means for developing an electric field across the gap;
- means for coupling photons to the semiconductor wafer through said dielectric material; and
- means for coupling a signal into and out of the reentrant resonant cavity.

8. A photon sensor as described in claim 7 in which said center post is a sleeve of electrically conducting material filled with photon transmission means.

9. A photon sensor as described in claim 8 in which said photon transmission means is an optical fiber terminating on a dielectric layer.

10. A photon sensor as described in claim 9 in which the maximum gap width is 10 microns, in which the lateral dimension of the electric field is less than the average distance required for an produced in the semiconductor material to recombine in the semiconductor material and in which the optimum wafer thickness is equal to the thickness in which the photon flux drops to $1/e$ of the incident phton flux.

PO-1050
(5/69)

UNITED STATES PATENT OFFICE
CERTIFICATE OF CORRECTION

Patent No. 3,612,883  Dated October 12, 1971

Inventor(s) Norman E. Pedersen

It is certified that error appears in the above-identified patent and that said Letters Patent are hereby corrected as shown below:

Column 1, line 24, for "$10^{18}$" read -- $10^{-8}$ --; column 1, line 30, for "$10^{18}$" read -- $10^{-8}$ --; column 2, line 53, for "while" read -- where --; column 3, line 29, for "$10^{18}$" read -- $10^{-8}$ --; column 3, line 73, for $10^{18}$" read -- $10^{-8}$--; column 4, line 19, for "electronic" read -- electric --; column 4, line 37, for "$10^{13}$" read -- $10^{-3}$ --; column 4, line 38, for " $\tau_m$ $10^{111}$" read -- $\tau_m \approx 10^{-11}$ --; column 4, line 47, for "though" read -- thought --; column 6, line 15, insert after "an" the following -- photo electron --.

Signed and sealed this 20th day of March 1973.

(SEAL)
Attest:

EDWARD M. FLETCHER, JR.
Attesting Officer

ROBERT GOTTSCHALK
Commissioner of Patents